Sept 10, 1957     R. A. CHRISTIAN ET AL     2,805,822
TOTALIZER CONTROLLING MECHANISM FOR ACCOUNTING MACHINES
Filed June 3, 1954     2 Sheets-Sheet 1
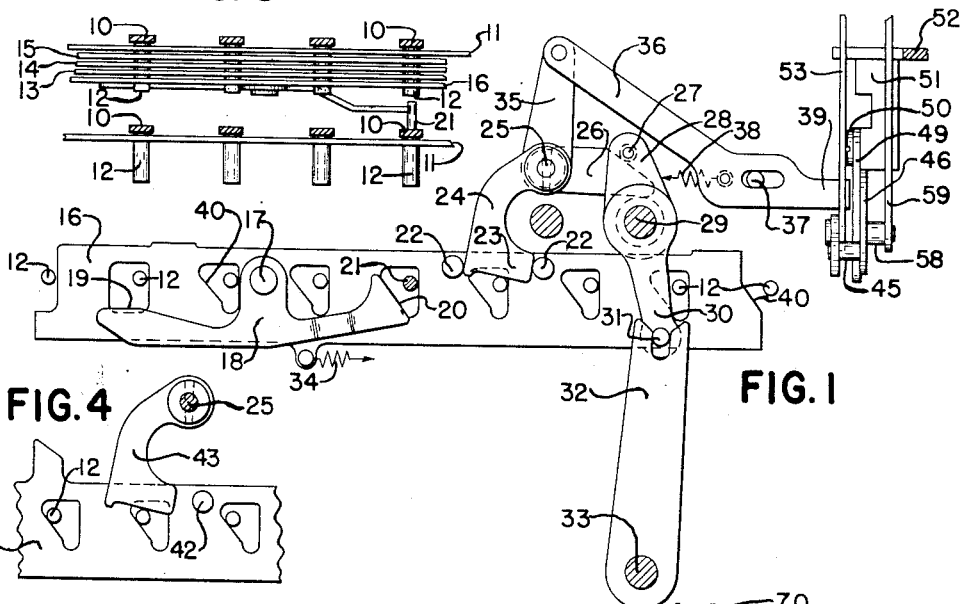
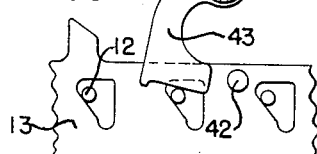
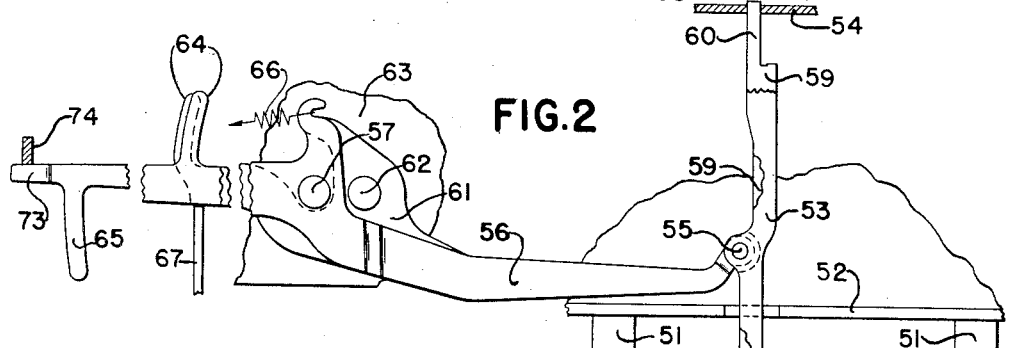
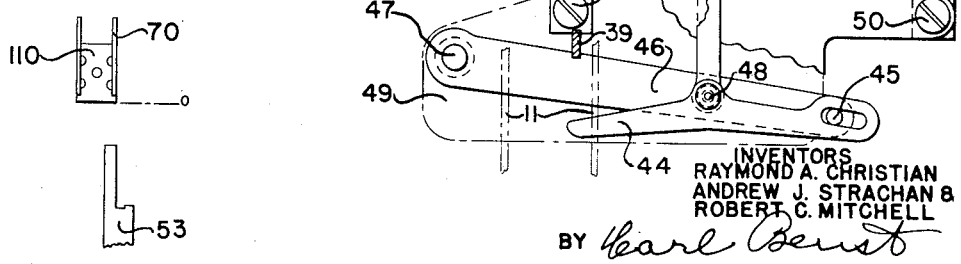
INVENTORS
RAYMOND A. CHRISTIAN
ANDREW J. STRACHAN &
ROBERT C. MITCHELL
BY Carl Beust
Richard Van Busum
THEIR ATTORNEYS Sept 10, 1957  R. A. CHRISTIAN ET AL  2,805,822
TOTALIZER CONTROLLING MECHANISM FOR ACCOUNTING MACHINES
Filed June 3, 1954  2 Sheets-Sheet 2

INVENTORS
RAYMOND A. CHRISTIAN
ANDREW J. STRACHAN &
ROBERT C. MITCHELL
BY
THEIR ATTORNEYS

United States Patent Office 2,805,822
Patented Sept. 10, 1957

2,805,822

TOTALIZER CONTROLLING MECHANISM FOR ACCOUNTING MACHINES

Raymond A. Christian, Andrew J. Strachan, and Robert C. Mitchell, Dayton, Ohio, assignors to The National Cash Register Company, Dayton, Ohio, a corporation of Maryland Application June 3, 1954, Serial No. 434,121

10 Claims. (Cl. 235—60.48)

This invention relates to accounting machines and the like and is particularly directed to the totalizer-controlling mechanism of such machines.

The machine chosen to illustrate the present invention is a well-known type of accounting machine which, in this particular adaptation, is arranged for preparing monthly toll statements for the numerous customers of a large telephone company. These statements include charges for all long-distance calls, some of which calls are taxable at one rate, in this particular case 15%, and others of which are taxable at a higher rate, in this particular case 25%. The amounts taxable at either rate are accumulated in one totalizer, and the amounts taxable at the higher rate are accumulated in said one totalizer and also in another totalizer. The machine is normally arranged to select a particular totalizer to receive the amounts taxable at either rate, and this invention is directed to mechanism to automatically select another totalizer to receive the amounts taxable at the higher rate when two conditions are fulfilled; namely, the traveling carriage must be in a predetermined columnar position, and amount keys of a certain value or over must be depressed.

Broadly, it is an object of the present invention to provide means to automatically select a certain totalizer to receive amounts set up on the amount keys when said amounts are of a certain value or over.

Another object is the provision of means whereby entering amounts of a certain value or over in the machine automatically selects and conditions a certain totalizer to receive said amounts.

A further object is to provide a machine, having a traveling carriage and amount keys, with means controlled jointly by the traveling carriage and amount keys of a certain value or over to select and condition a particular totalizer to receive the amounts set up on said amount keys.

With these and incidental objects in view, the invention includes certain novel features of construction and combinations of parts, a preferred form or embodiment of which is hereinafter described with reference to the drawings which accompany and form a part of this specification.

In the drawings:

Fig. 1 is a side elevation, as observed from the right of the machine, of the ten-cent amount bank and mechanism associated therewith for controlling the automatic selection of a certain totalizer.

Fig. 2 is a front elevation of mechanism controlled by the traveling carriage in predetermined columnar positions thereof, and coacting with the mechanism shown in Fig. 1, for controlling the automatic selection of said certain totalizer.

Fig. 3 is a top plan view of a part of the mechanism shown in Fig. 1.

Fig. 4 is a fragmentary view of one of the control plates in the higher denominational orders and the mechanism associated therewith for controlling the selection of said certain totalizer.

Fig. 5 is a detail view of a function control plate and the sensing finger associated therewith.

Description

Figure 6:
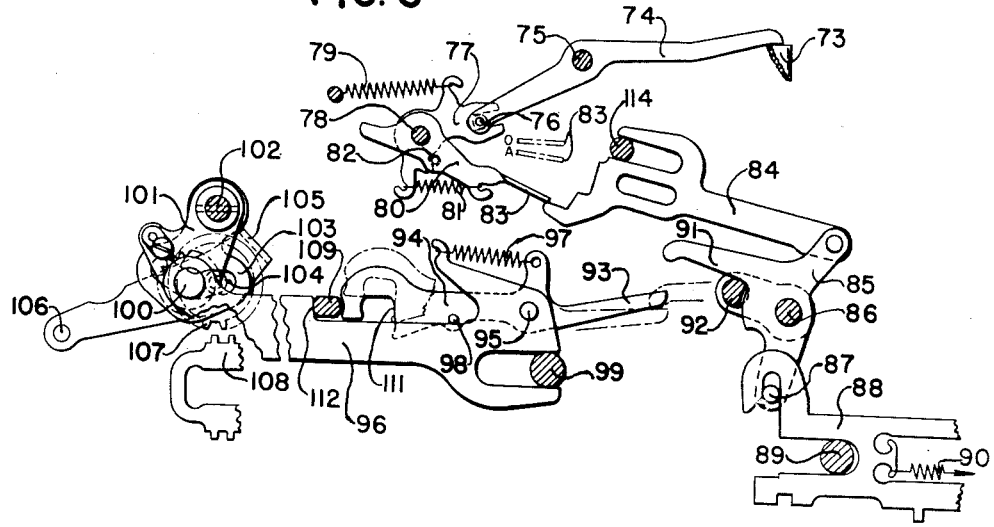
Fig. 6 is a left side elevation of the certain totalizer which is controlled by the mechanism shown in Figs. 1 to 5 inclusive, and the selecting and conditioning mechanism associated therewith.

The following description is directed particularly to mechanism controlled by effective amount keys representing a value of 25 cents, 30 cents and over for automatically selecting a certain totalizer to receive the amount represented by said keys. The mechanism necessary to obtain this result will be fully disclosed in the following description, used in conjunction with the accompanying drawings, which adequately illustrate the mechanism pertinent to the present invention.

The mechanism of the present invention is applied to a machine similar in every respect to that disclosed in United States Patent No. 2,626,749, issued January 27, 1953, to Raymond A. Christian et al., to which reference may be had for a complete disclosure of the machine, including mechanism which is not pertinent to the present invention and which for that reason will not be described in the present application.

The machine chosen to illustrate the present invention has a full complement of amount keys 10 (Fig. 3), only portions of the units and tens of cents rows being shown herein, which amount keys, when depressed, control the positioning of corresponding denominational actuator racks 108 (Fig. 6) for entering the values of said depressed keys in the selected totalizers. The amount keys 10 are depressibly supported on the left-hand faces of corresponding order plates 11, which form a part of the keyboard framework, said framework being removable from the machine as a unit for convenience of assembly and repair. Each of the amount keys 10 carries a corresponding pin 12, which extends through and coacts with corresponding camming surfaces and locking projections formed on corresponding control plates 13, corresponding flexible detents 14, and corresponding locking detents 15, all of which are mounted for horizontal shifting movement on the right-hand side of the corresponding order plates 11, as shown in Fig. 3.

In addition to the control plates explained above, the ten-cent amount bank has a special control plate 16 (Figs. 1 and 3), which is mounted for horizontal sliding movement exactly as explained for the plates 13, 14, and 15. The plate 16 carries a stud 17, which pivotally supports a floating lever 18, having a surface 19, which cooperates with the pin 12 in the 20-cent amount key 10. The lever 18 has an outwardly-bent arm (Fig. 3) with an angular nose 20, which cooperates with a stud 21 in the five-cent amount key 12. The plate 16 carries two studs 22, which embrace a foot-shaped downward extension 23 of a leg 24 secured on a shaft 25 journaled in the keyboard framework. Also secured on the shaft 25 is an arm 26 with an angular surface which coacts with a stud 27 in a crank 28 fast on a key lock shaft 29 journaled in the keyboard framework. Also fast on the key lock shaft 29 is a crank 30 having a stud 31 engaged by the bifurcated upper end of an arm 32 fast on a machine release shaft 33 journaled in the machine framework. The parts 29, 30, 32, and 33 are similar, respectively, to the corresponding parts 878, 877, 875, and 282 disclosed in Fig. 135 of the Christian et al. Patent No. 2,626,749, to which reference may be had for a further description of the construction and operation of said parts and associated mechanisms.

Releasing the machine for operation, either manually or automatically, the latter being under control of the traveling carriage in predetermined columnar positions thereof, frees the shaft 33 and the arm 32 (Fig. 1) for counter-clockwise movement under the influence of yieldable means (not shown). Counter-clockwise movement of the arm 32 imparts clockwise movement to the crank 30, the shaft 29, and the crank 28 to withdraw the stud 27 in said crank from the angular surface on the arm 26, to free said arm, the shaft 25, and the leg 24 for counter-clockwise movement as the control plate 16 is shifted rearwardly under influence of a spring 34. Also secured to the shaft 25, and moving counter-clockwise in unison therewith, is a crank 35 having pivotally connected thereto the forward end of a pitman 36 with a slot near its rear end which engages a stationary stud 37 in the machine framework, to shiftably support said pitman. The pitman 36 moves forwardly, or counter-clockwise, in unison with the crank 35 under influence of the spring 34 and a spring 38, which is tensioned between said pitman and a stationary stud. Near the end of machine operation, the shaft 33 (Fig. 1) and the arm 32 are restored clockwise to normal position, as shown here, and in turn restore the parts connected therewith, including the shaft 25 and the control plate 16, said parts being latched in their restored position under influence of the usual mechanism (not shown) provided for latching the release shaft 33 in unreleased position, as fully disclosed in the Christian et al. patent referred to hereinbefore.

Whenever amounts of 24 cents or under are set up on the amount keys 10 (Figs. 1 and 3), the control slide 16 is free to move rearwardly, as explained above, to shift the pitman 36 forwardly to move a rearward extension 39 of said pitman out of coacting relationship with the mechanism which controls the automatic selection of the #8 totalizer, so that under these conditions said totalizer will remain inoperative. The pins 12 in the 30-cent to 90-cent keys inclusive of the dimes, or tens of cents, amount bank cooperate with corresponding angular camming surfaces 40 formed in openings in the plate 16, and the left wall of notches formed at the bottom of said openings, the surface 40 for the pin 12 in the 90-cent key being formed on the rear edge of said plate 16, as shown in Fig. 1.

Depression of any one of the 30-cent to 90-cent amount keys causes the pin 12 therein, in cooperation with the angular camming surface 40, and the notch formed at the bottom thereof, to retain the control plate 16 in its forward position during machine operation, and, as a result, the pitman 36 remains in its rearward position, as shown here, to retain its extension 39 in the path of the control mechanism for the #8 totalizer to cause said totalizer to be automatically selected, as will be explained presently. It will be noted that the opening in the control plate 16 for the pin 12 for the 20-cent key does not have an angular camming surface 40, and consequently depression of said key does not interfere with rearward movement of the control plate 16 to render the automatic selecting mechanism for the #8 totalizer inoperative. Likewise the pin 12 in the 10-cent amount key (Fig. 1) does not interfere with rearward movement of the control plate 16, and therefore said plate is free to move rearwardly to shift the pitman 36 forwardly to prevent automatic selection of the #8 totalizer.

Depression of the 20-cent key (Figs. 1 and 3) moves the pin 12 therein into near-contact with the horizontal surface 19 on the forward extension of the lever 18. However, depression of the 20-cent key alone does not interfere with rearward movement of the control plate 16. Depression of the 5-cent key in the units of cents row moves the stud 21 therein into engagement with the angular surface 20 on the rear end of the lever 18, and, as the pin 12 in the depressed 20-cent key obstructs rocking movement of said lever, the control plate 16 is prevented from moving rearwardly, upon operation of the release mechanism, as explained before, and thus effects automatic selection of the #8 totalizer for adding operation, as will be explained presently. It should be noted that depressing the 5-cent amount key alone will not obstruct rearward movement of the control plate 16, as the lever 18 is free to rock clockwise to permit such rearward movement. It is necessary that the 5-cent amount key and the 20-cent amount key be used jointly, or in conjunction with each other, as explained above, to prevent rearward movement of the control plate 16, to effect automatic selection of the #8 totalizer for the accumulation of amounts of 25 cents or over. The forward stud 22 in the control plate 16 (Fig. 1) cooperates with the heel of the foot 23 to insure that said plate is restored forwardly to normal position, as shown here, and retained in that position against the action of the spring 34.

Each of the control plates 13 for the higher order amount banks (Fig. 4) carries a stud 42, which cooperates with the toe of a foot-shaped downward extension on a corresponding leg 43, similar to the leg 24, said leg being secured to the shaft 25. It will be noted that in this case there is no forward stud 42 cooperating with the heel of the foot to retain the control plate 13 in its forward position, but said plate is arranged to normally rest in its rearward position under the influence of its spring 34. Depression of one of the higher order keys causes the pin 12 therein, in cooperation with the corresponding camming opening in the corresponding control plate 13 to shift said plate forwardly to move the stud 42 into the path of the toe of the leg 43 to obstruct counter-clockwise movement of said leg and the shaft 25 to retain the pitman 36 in its effective, or rearward, position, as shown in Fig. 1, to automatically select the #8 totalizer for adding operation, to receive the higher order amounts.

The extension 39 of the ptiman 36 (Figs. 1 and 2) coacts with the left-hand end of a lever 44, having in its right-hand end a slot which engages a stud 45 in an arm 46 free on a stud 47 secured in a bracket 49. The bracket 49 is secured by screws 50 (Fig. 2) to posts 51 extending downwardly from an angle bar 52, in turn secured to the main framework of the machine. The lever 44 (Fig. 2) is pivotally connected at 48 to the lower end of a sensing finger 53, the reduced upper end of which extends through a corresponding guide slot in a plate 54 secured to the machine framework. The finger 53 is pivoted at 55 to the right-hand end of a lever 56 pivoted on a stud 57 secured in a plate 63 rigidly connected to the angle bar 52. The arm 46 carries a stud 58 (Figs. 1 and 2), to which is pivotally connected the lower end of a sensing finger 59, similar in outline to the finger 53, and located just to the rear thereof, as observed in Fig. 2, and said finger has a reduced upper end 60, which passes through a corresponding guide slot in the plate 54. The finger 59 is pivotally connected near its center to a lever 61, in turn pivotally mounted on a stud 62 secured in the plate 63.

The levers 56 and 61 (Fig. 2) have upwardly-extending fingers 64, which engage annular guide grooves in corresponding studs (not shown) secured in the plate 63. The lever 56 has a downwardly-extending finger 65, which engages a corresponding guide slot in a plate (not shown). Springs 66, tensioned between hooks, formed on the levers 56 and 61, and stationary studs (not shown), urge said levers counterclockwise (Fig. 2) to normally maintain the lower surfaces of their left-hand extensions in yielding contact with the upper end of an operating slide 67 mounted for vertical shifting movement on the left main frame of the machine.

Near the beginning of machine operation, the slide 67 moves downwardly to free the levers 56 and 61 to the action of the springs 66, which urge said levers counterclockwise, to cause the upward extension 60 of the finger 59 to sense for a downward projection 68 on a function-control plate 69 carried by a carriage stop 70 positionably mounted on a carriage stop bar 71, in turn removably supported by a carriage escapement bar 72, which is secured to the traveling carriage framework, as fully disclosed in the Christian et al. Patent No. 2,626,749.

The sensing finger 53 (Fig. 5) has an extension, similar to the extension 60 for the sensing finger 59, which senses for the corresponding downward surface on a non-add control plate 110, similar to the control plate 69 and mounted in the stop 70. The finger 53 coacts with the control plate 110 to cause the #8 totalizer to be non-added when the projection 39 of the pitman 36 (Fig. 1) is withdrawn from the path of the lever 44, as will be explained more fully later. Near the end of machine operation, upward return movement of the slide 67 (Fig. 2) restores the levers 56 and 61 clockwise to normal position, and this in turn restores the corresponding sensing fingers 53 and 59 downwardly to normal position, as shown here.

An extreme left-hand extension 73 (Figs. 2 and 6) of the lever 56 underlies and cooperates with the forward end of a lever 74 free on a stud 75 fast in the machine framework. A rearward arm on the lever 74 carries a stud 76 engaged by a slot in an arm 77 free on a rod 78 supported in the machine framework. A spring 79 urges the arm 77 counterclockwise, which in turn urges the lever 75 clockwise to normally maintain its forward extension in yielding contact with the extension 73 of the lever 56. Adjacent the arm 77, and free on the rod 78, is a companion arm 80 carrying a stud 82, which is normally maintained in engagement with a shoulder formed on said arm 77 by a spring 81 tensioned between said arms, to form a yielding connection therebetween. The arm 81 has a forwardly-extending control finger 83 (Fig. 6), which cooperates with control surfaces on the rear end of a pitman 84 having a guide slot which engages an annular groove in a stud 114 secured in the machine framework, to shiftably support said pitman. The forward end of the pitman 84 is pivotally connected to an upward extension of a pitman-shifting lever 85 free on a rod 86 supported in the machine framework. A downward extension of the lever 85 carries a stud 87, which engages a slot in a hook-shaped extension of a control slide 88 mounted for horizontal shifting movement by means of parallel slots therein, in cooperation with studs 89 secured in the machine framework, only one of said studs and said slots being shown herein. A spring 90 urges the slide 88 forwardly to in turn urge the lever 85 counterclockwise to normally maintain a rearwardly-extending finger 91 thereof in yielding contact with a bail 92 supported between similar arms in turn rotatably mounted on the rod 86. The bail 92 operates first counter-clockwise and then back to normal position to cause the lever 85 to move in unison therewith, under influence of the spring 90, to shift the pitman 84 rearwardly to cause the control surfaces thereon to sense for and engage the finger 83, which has been previously positioned, to position said pitman and said lever 85 accordingly, for a purpose to be explained presently.

The finger 91 (Fig. 6) of the lever 85 cooperates with a tail 93 of a hook 94 pivoted at 95 on a totalizer-engaging pitman 96. A spring 97, tensioned between the hook 94 and the pitman 96, urges said hook counter-clockwise to normally maintain a stop stud 98, carried thereby, in engagement with an upward surface of said pitman 96 to determine the normal position of said hook 94. The pitman 96 has a slot near its forward end which engages a corresponding annular groove in a rod 99 supported in the machine framework. The rear end of the pitman 96 is pivotally supported by a stud 100 in a crank 101 secured on the left-hand end of a No. 8 totalizer-engaging shaft 102, rotatably supported in the totalizer framework. Also secured on opposite ends of the shaft 102 are totalizer-engaging cams 103, having cam slots which cooperate with corresponding rollers 104 supported on opposite ends of a No. 8 totalizer shaft, supported between the side arms of a rockable totalizer yoke 105 pivotally mounted on studs 106 secured in the totalizer framework. The totalizer shaft likewise rotatably supports a series of denominational totalizer wheels 107 for the No. 8 totalizer, the teeth of which are arranged to coact with teeth formed on corresponding actuator racks 108, mounted for horizontal shifting movement in the machine and positionable under control of the depressed amount keys 10 (Fig. 3) in adding and subtracting operations, to enter the values of said keys into the corresponding totalizer wheels 107. The No. 8 totalizer is provided with the usual tens transfer mechanism for transferring tens digits from lower to high denominations in adding operations, and for transferring tens digits from higher to lower denominations in subtracting operations. In total-taking operations, the add transfer pawls serve to stop the corresponding totalizer wheels in zero position, to position the actuators in accordance with the amounts standing on said totalizer wheels.

The pitman 96 is operated to engage and disengage the totalizer and the actuators in proper timing for the type of operation being performed, by means of a totalizer-engaging bar 109 (Fig. 6), which cooperates with a shoulder 112 on said pitman and with surfaces formed on the hook 94. The bar 109 makes four distinct movements for engaging and disengaging the totalizer for different types of operations, two of said movements being in a forward or right-hand direction, as observed in Fig. 6, and two of said movements being in a return or left-hand direction, with a slight rest period between each movement. The operation of the hook 94, in relation to the movement of the engaging bar 109, determines the timing in which the No. 8 totalizer wheels will be engaged with and disengaged from the amount actuators 108 in accordance with the type of operation being performed.

Depressing the 20-cent key 10 (Figs. 1 and 3) moves its pin 12 into the path of the surface 19 to block clockwise movement of the lever 18, and depressing the 5-cent key 10, in conjunction with the 20-cent key, moves the stud 21 therein into the path of the angular surface 20 to obstruct rearward movement of the control plate 16, when the stud 27 moves out of engagement with the angular surface on the arm 26 upon release of the machine for operation, as previously explained. This causes the extension 39 of the pitman 36 to remain in the path of the lever 44 (Figs. 1 and 2) to set up a condition which will cause the #8 totalizer to be selected for adding operation when the traveling carriage is in a columnar position where the projection 68 of the control plates 69 obstructs upward movement of the finger 59 to retain the arm 46 in its normal position, as shown in Fig. 2, upon initial movement downwardly of the slide 67. During initial movement downwardly of the slide 67, the lever 56 is free to move in unison therewith, under influence of the spring 66, and in so doing shifts the finger 53 upwardly to rock the lever 44 clockwise on its pivot 45 until said lever contacts the extension 39 of the pitman 36. This positions the finger 53 and the lever 56 so as to cause the left-hand extension 73 of said lever (Figs. 2 and 6) to position the lever 74, the arm 77, the stop arm 80, and the finger 83 in adding position, as shown in dot-and-dash lines. After the finger 83 has thus been positioned, operation of the bail 92 causes the slide 88 and the lever 85 to shift the pitman 84 rearwardly until the control surface on said pitman contacts the stop finger 83 to position said pitman, the lever 85, and the finger 91 in adding position, as shown in dot-and-dash lines. The above-described positioning of the finger 91 causes the tip of said finger to engage the tail 93 and rock the hook 94 from normal position, as shown in full lines in Fig. 6, to adding position, as shown in dot-and-dash lines. This selects and conditions the #8 totalizer for an adding operation, and, immediately afterward, initial movement forwardly of the totalizer-engaging and -disengaging bar 109 causes said bar to engage a surface 111 on the hook 94 to shift the pitman 96 forwardly to engage the wheels 107 of the #8 totalizer with the amount actuators 108, after said actuators have completed their initial movement, during which movement they are positioned by the depressed amount keys in the usual and well-known manner. Return movement of the actuators 108 rotates the wheels 107 of the #8 totalizer in a forward direction to enter therein the values of the depressed amount keys. After the amount actuators 108 have completed their return movement, the bar 109 operates in a return direction, during which it engages a shoulder 112, formed on the pitman 96, and restores said pitman rearwardly to normal position, to disengage the wheels 107 of the #8 totalizer from the actuators 108.

Depressing the 30-cent to 90-cent keys inclusive, in the 10-cent amount bank (Figs. 1 and 3), obstructs rearward movement of the control plate 16, in the manner explained previously, to cause the #8 totalizer to be automatically selected for adding operations to receive the amounts represented by said 30- to 90-cent keys. Likewise, depressing any of the keys of the amount banks of higher order than the 10-cent amount bank causes said keys to shift the corresponding control plate 13 (Figs. 3 and 4) forwardly, whereupon the stud 42 in said plate moves into obstructing relationship with the corresponding leg 43 to prevent counter-clockwise movement of the shaft 25 and thus cause the #8 totalizer to be automatically selected and conditioned for an adding operation to receive the higher order amounts.

As previously explained, when the control plate 16 (Fig. 1) is free to move rearwardly under influence of the spring 34, upon release of the machine for operation, resulting counter-clockwise movement of the shaft 25 shifts the pitman 36 forwardly to move its extension 39 out of the path of the lever 44. Consequently the lever 44, the finger 53, and the lever 56 are free to move full distance upwardly and counter-clockwise, respectively, under influence of the spring 66, during initial movement downwardly of the slide 67, until the upward extension of said finger 53 contacts the control plate 110, mounted in the stop 70 (Fig. 5), to position said parts in non-adding position. This positioning of the lever 56, through the lever 74 (Fig. 6), positions the arms 77 and 80 and the finger 83 in non-adding position, which is the uppermost position of said finger 83, as shown in dot-and-dash lines in Fig. 6, to permit full movement rearwardly of the pitman 84 upon operation of the bail 92. This full movement of the pitman 84 and the finger 91 causes said finger, in cooperation with the tail 93, to rock the hook 94 to its extreme clockwise position, in which position the rear end of said pitman is out of the path of the bar 109. Consequently, operation of said bar imparts no movement to the engaging pitman 96, and, as a result, the #8 totalizer is non-added.

A control plate 69 (Fig. 2), with a projection 68 of other than full or "T" length, permits sufficient upward movement of the finger 59, upon initial operation of the slide 67 and the lever 61, to rock the arm 46 a sufficient distance counter-clockwise to increase the effective distance between the left-hand end of the lever 44 and the extension 39 so that said lever is free to move a further extent clockwise to position the corresponding finger 53 and the lever 56 in non-adding position instead of adding position, to cause the #8 totalizer to be non-added.

It should, therefore, be clear from the preceding description that two conditions are necessary before the #8 totalizer will be automatically selected for an adding operation. These conditions are that the control plate 16 (Fig. 2) must be retained in its forward position to in turn retain the extension 39 of the pitman 36 in the path of the lever 44, and a full or "T" length control plate 69 (Fig. 2) must be in the path of the finger 59 to obstruct upward movement of said finger so that the lever 56 will be properly positioned upon initial movement of the slide 67 to select and condition the #8 totalizer for an adding operation to receive the amount set up on the keyboard, which, as previously explained, must be 25 cents or more.

While the form of mechanism shown and described herein is admirably adapted to fulfill the objects primarily stated, it is to be understood that it is not intended to confine the invention to the one form or embodiment disclosed herein, for it is susceptible of embodiment in various other forms without departing from the spirit and scope of said invention.

What is claimed is:

1. In a machine of the class described, having a traveling carriage movable to various predetermined columnar positions, amount keys effective when depressed to set up amounts, and a totalizer to receive the amounts set up, the combination of a member; connections between the member and the traveling carriage, whereby said traveling carriage when in a predetermined columnar position controls the positioning of said member; an element mounted on the member; connections between the element and the totalizer whereby said element controls the selecting and conditioning of said totalizer; and means including a pitman controlled by certain amount keys of different denominational orders when said keys are effective, and coacting with the element to cause the totalizer to be selected and conditioned to receive the amount set up on said certain effective amount keys.

2. In a machine of the class described, having a traveling carriage, amount keys effective when depressed to set up amounts, a totalizer to receive the amounts set up on the amount keys, and actuators for the totalizer, the combination of means to engage and disengage the totalizer and the actuators; means to operate the engaging and disengaging means; means to connect the operating means to the engaging and disengaging means; a pitman yieldingly movable from an effective to an ineffective position each machine operation; means operated by certain amount keys when depressed to retain the pitman in effective position; and means including a member controlled by the traveling carriage and an element mounted on said member and controlled jointly by said member and the pitman when said pitman is in effective position to control the operation of the connecting means to cause the totalizer and the actuators to be properly engaged and disengaged to receive the amounts set up on said certain depressed amount keys.

3. In a machine of the class described, having a traveling carriage, amount keys effective when depressed to set up amounts, and a totalizer to receive the amounts set up on the amount keys, the combination of a member controlled by the traveling carriage when in a predetermined columnar position; a pitman constructed and arranged to be rendered effective by certain depressed amount keps; and means including an element mounted on the member and controlled jointly by said member and by the pitman, when said member is controlled by the traveling carriage, and when said pitman is effective, to cause the totalizer to be selected and conditioned to receive the amount set up on said certain depressed amount keys.

4. In a machine of the class described, having a traveling carriage, movable to various predetermined columnar positions, amount keys effective when depressed to set up amounts, a totalizer to receive the amounts set up on the amount keys, and amount actuators to transmit values from the effective amount keys to the totalizer, the combination of a member controlled by the traveling carriage when in a predetermined columnar position; an element mounted on the member; a pitman constructed and arranged to coact with the element; means effective each machine operation to move the pitman out of coacting relationship with the element; means operated by certain amount keys of different denominational orders, when depressed, to render the moving means inoperative to retain the pitman in coacting relationship with the element; and means controlled by the element, when the member is controlled by the traveling carriage, and when the pitman is retained in coacting relationship with said element, to cause the totalizer and the actuators to be properly engaged and disengaged to receive the amount set up on said certain depressed amount keys of different denominational orders.

5. In a machine of the class described, having a traveling carriage, amount keys, a totalizer to receive amounts set up on the amount keys, and amount actuators to transmit values from the effective amount keys to the totalizer, the combination of a member controlled by the traveling carriage when in a predetermined columnar position; an element mounted on the member; a pitman coacting with the element; a slide connected to the pitman and operable each machine operation to move the pitman out of coacting relationship with the element; means on the slide controlled jointly by certain amount keys of different denominational orders to prevent operation of said slide to retain the pitman in coacting relationship with the element; and means controlled by the element when the member is controlled by the traveling carriage and when the pitman is in coacting relationship with the said element to cause the totalizer and the actuators to be properly engaged and disengaged to receive the amounts set up on said certain amount keys of different denominational orders.

6. In a machine of the character described, having a traveling carriage, amount keys, and a totalizer to receive amounts set up on the amount keys, the combination of a member controlled by the traveling carriage when in a predetermined columnar position; a pitman controlled by certain amount keys; an element mounted on the member and controlled jointly by said member and by the pitman; and means rendered effective by the element when it is controlled jointly by the member and by the pitman to cause the totalizer to be selected and conditioned to receive the amounts set up on said certain amount keys.

7. In a machine of the class described, having a traveling carriage, amount keys, and a totalizer to receive amounts set up on certain of said amount keys, the combination of a member controlled by the traveling carriage; an element mounted on the member; a pitman normally effective to coact with the element; non-positive means operating each machine operation to move the pitman out of coacting relationship with the element; means operated by certain amount keys when effective to retain the pitman against movement by the non-positive moving means to cause the element to be positioned under joint control of the traveling carriage and said certain amount keys; and means rendered effective by the element when positioned jointly by the traveling carriage and said certain amount keys to select and condition the totalizer to receive the amounts set up on said certain amount keys.

8. In a machine of the class described, having a traveling carriage, amount keys, and a totalizer to receive amounts set up on the amount keys, the combination of a control part on the traveling carriage; means to sense the control part; a member connected to the sensing means and positionable thereby in accordance with the presence or non-presence of the control part; an element mounted on the member; a pitman normally in coacting relationship with the element; non-positive means operating each machine operation to move the pitman out of coacting relationship with the element; means operated by certain amount keys when effective to retain the pitman against movement by the non-positive moving means; means to cause the element to sense for the presence or non-presence of the pitman; and means controlled by the element when it is positioned jointly under control of the control part and the pitman to cause the totalizer to be selected and conditioned to receive the amounts set up on said certain amount keys.

9. In a machine of the character described, the combination with a traveling carriage, amount keys to set up amounts, a totalizer to receive the amounts set up, actuators to transmit amounts from the effective amount keys to the totalizer, means to engage and disengage the totalizer and the actuators, means to operate the engaging and disengaging means, and means to connect the operating means to the engaging and disengaging means, of a control part on the traveling carriage; means to sense the control part; a member connected to the sensing means and positionable thereby in accordance with the presence or non-presence of a control part; an element mounted on the member; a pitman normally in coacting relationship with the element; yieldable means operable each machine operation to move the pitman out of coacting relationship with the element; means operated by certain amount keys when effective to retain the pitman against movement by the yieldable moving means; means to cause the element to sense for the presence or non-presence of the pitman; and means connected to the latter sensing means and controlled by the element when it is positioned jointly under control of the control part and the pitman to govern the operation of the connecting means to cause the totalizer and the actuators to be properly engaged and disengaged to receive the amounts set up on said certain amount keys.

10. In a machine of the class described, the combination with a traveling carriage positionable in predetermined columnar positions, amount keys to set up amounts, a totalizer to receive the amounts set up, actuators to transmit amounts from the effective amount keys to the totalizer, means to engage and disengage the totalizer and the actuators, means to operate the engaging and disengaging means, and means to connect the operating means to the engaging and disengaging means, of a control part mounted on the traveling carriage in relation to a predetermined columnar position; a pitman positionable in an effective position under control of certain amount keys when effective; a member; means connected to the member to sense for the presence of the control part to position said member accordingly; an element mounted on the member to sense for the presence of the pitman in effective position to position said element accordingly; and means connected to the latter sensing means and effective when the element and the member are positioned by the control part and the pitman to govern the operation of the connecting means to cause the totalizer and the actuators to be properly engaged and disengaged to receive the amounts set up on said certain effective amount keys.

References Cited in the file of this patent

UNITED STATES PATENTS 2,189,851     Williams et al.  ---------- Feb. 13, 1940